(12) United States Patent
Lafont

(10) Patent No.: US 8,496,438 B2
(45) Date of Patent: Jul. 30, 2013

(54) BLADE RETAINING DEVICE FOR TURBO MACHINE PROPELLER

(75) Inventor: Laurent Lafont, Pechbusque (FR)

(73) Assignee: Airbus Operations SAS, Toulouse (FR)

( * ) Notice: Subject to any disclaimer, the term of this patent is extended or adjusted under 35 U.S.C. 154(b) by 586 days.

(21) Appl. No.: 12/709,793

(22) Filed: Feb. 22, 2010

(65) Prior Publication Data
US 2010/0215499 A1   Aug. 26, 2010

(30) Foreign Application Priority Data

Feb. 23, 2009   (FR) ...................................... 09 51132

(51) Int. Cl.
*F01D 5/30*   (2006.01)
(52) U.S. Cl.
USPC ................................... 416/204 A; 416/204 R
(58) Field of Classification Search
USPC .......... 416/204 A, 210 R, 210 A, 239, 220 R, 416/204 R, 238
See application file for complete search history.

(56) References Cited

U.S. PATENT DOCUMENTS

| | | | | | |
|---|---|---|---|---|---|
| 1,449,685 | A | * | 3/1923 | Luther et al. ...................... | 416/89 |
| 1,454,977 | A | * | 5/1923 | Middleton ..................... | 416/233 |
| 1,769,801 | A | * | 7/1930 | McCauley ..................... | 416/207 |
| 2,302,054 | A | * | 11/1942 | Putt ................................ | 416/136 |
| 3,480,373 | A | * | 11/1969 | Talbot ............................ | 416/226 |
| 4,524,499 | A | * | 6/1985 | Grimes et al. ............... | 29/889.61 |
| 4,826,403 | A | | 5/1989 | Catlow | |
| 5,022,824 | A | | 6/1991 | Violette et al. | |
| 6,155,784 | A | * | 12/2000 | Carter, Jr. ................. | 416/134 A |
| 2009/0004008 | A1 | * | 1/2009 | Richards ........................ | 416/145 |
| 2009/0035139 | A1 | * | 2/2009 | Mosiewicz ................ | 416/204 R |

FOREIGN PATENT DOCUMENTS

| | | |
|---|---|---|
| DE | 1 503 480 | 7/1970 |
| DE | 40 15 207 C1 | 10/1991 |
| FR | 2 601 069 | 1/1988 |
| GB | 2 051 967 A | 1/1981 |

OTHER PUBLICATIONS

U.S. Appl. No. 13/386,173, filed Jan. 20, 2012, Lafont.
U.S. Appl. No. 13/260,130, filed Sep. 23, 2011, Lafont, et al.
French Search Report issued Oct. 23, 2009 in French Application No. 0951132.

* cited by examiner

*Primary Examiner* — Nathaniel Wiehe
*Assistant Examiner* — Aaron Jagoda
(74) *Attorney, Agent, or Firm* — Oblon, Spivak, McClelland, Maier & Neustadt, L.L.P.

(57) ABSTRACT

The invention concerns an aircraft turbomachine propeller comprising a plurality of blades (1) each comprising a root (20) mounted on a hub (2) rotating about the rotation axis of the propeller (I-I), and its purpose is to reduce the risks of loss of the entire blade (1) following an impact by a foreign body. To achieve this, at least one blade (1) comprises a means (30) of retaining the blade in an outwards radial direction, said retaining means (30) being engaged in a housing (5) of said blade (1) opening radially inwards at the root of the blade (20), and fixed in translation in said outwards radial direction.

8 Claims, 6 Drawing Sheets

BLADE RETAINING DEVICE FOR TURBO MACHINE PROPELLER

TECHNICAL DOMAIN

This invention relates to an aircraft turbomachine propeller formed from a set of blades mounted on the rotating support. The invention relates more particularly to a blade retaining device on said support.

STATE OF PRIOR ART

Conventionally, an <<open rotor>> type propeller turbomachine comprises two counter-rotating propellers each with a plurality of blades.

The turbomachine usually comprises a free turbine with two counter-rotating rotors, each rotor driving a rotating support on which the blades of one of the propellers are mounted, about the rotation axis of the propeller.

FIG. 1 illustrates a longitudinal section along the rotation axis of the propeller showing an example of part of a propeller comprising a blade 1 mounted on a propeller hub 2.

Note that in this case the rotation axis of the propeller I-I coincides with the engine axis. Subsequently, a direct orthogonal coordinate system is defined in cylindrical coordinates ($e_L, e_R, e_T$), where $e_L$ is the longitudinal direction corresponding to the rotation axis of the propeller I-I and oriented along the direction of movement of the aircraft created by the thrust of the turbomachine, $e_R$ is the radial direction of a point belonging to the turbomachine and $e_T$ is the tangential or circumferential direction at this point.

The blade 1 comprises an airfoil 10 that prolongs a blade root 20 fitted on said propeller hub 2.

The hub 2 is a substantially annular part. It comprises a plurality of through orifices along the radial direction $e_R$, each orifice housing the root of the corresponding blade.

Said airfoil 10 is located so as to be in contact with the air surrounding the turbomachine and extends along the direction approximately parallel to $e_R$. The airfoil 10 is delimited by a shell 11 for which the general shape results in an aerodynamic profile. The shell 11 surrounds a hollow structural core 12 that extends along a direction approximately parallel to $e_R$.

The blade root 20 is mounted free to pivot about a secondary axis II-II parallel to the radial direction $e_R$ on the hub 2, the pivoting movement making use of a ball bearing system 3.

A mechanism for setting the incidence of the blade 40 is usually provided to modify the incidence of the blade considered. The lower surface of the root 20 is integrally mounted on a rod 41 that extends in the radially inwards direction $e_R$.

The terms <<upper>> and <<lower>> in this disclosure should be understood in terms of distance from the rotation axis of the propeller I-I.

Furthermore, the expressions <<outwards>> and <<inwards>> should be understood as being a radial movement away from or towards the rotation axis of the propeller I-I.

More precisely, the rod 41 usually comprises a reception base at its upper end into which the lower part of the root 20 fits. The periphery of the lower part of the root 20 forms a gear that engages in a toothed wheel formed by the base into which the rod 41 fits.

Furthermore, the lower end of the rod 41 comprises a gear 42 that engages in a toothed wheel 43 of the blade incidence setting mechanism 40.

Thus, actuation of the toothed wheel 43 of the blade incidence setting mechanism 40 rotates the rod 41, which pivots the blade 1 to obtain the required incidence.

The propeller hub 2 is clamped between two coaxial cases, a central case 50 and a lower case 60 that together delimit a hot air flow path 80, and rotates relative to these cases. An upper case 70 is also provided and surrounds said cases 50, 60 and the hub 2. It delimits the aerodynamic profile of the turbomachine.

Thus, the propeller comprises a part rotating about the propeller rotation axis comprising said blade mounted on the hub, and the mechanism for setting the incidence of the blade. Nevertheless, a propeller according to this example of prior art has the disadvantage that an impact of a foreign body such as a bird or a hailstone against the airfoil, or the development of a fatigue crack or a corrosion point, creates a particularly high risk that part of the blade or all of the blade can be separated. The released part can then strike the fuselage of the aircraft or the adjacent airfoils, and cause damage with a severity that increases with increasing mass of the debris. Note that the root is the most massive part of the blade. The propeller according to the embodiment of prior art described above does not minimise risks of losing the blade in general, and the root of the blade in particular.

PRESENTATION OF THE INVENTION

The main purpose of the invention is to present an aircraft turbomachine propeller that at least partly corrects the disadvantages mentioned above relative to manufacturing according to prior art described with reference to FIG. 1.

To achieve this, the purpose of the invention is an aircraft turbomachine propeller comprising a plurality of blades each comprising a root mounted on a hub rotating about a rotation axis of the propeller.

According to the invention, at least one blade comprises a means of retaining the blade in an outwards radial direction, said retaining means being engaged in a housing of said blade opening radially inwards at the root of the blade, and fixed in translation in said outwards radial direction.

Thus, the invention provides additional means for maintaining the entire blade, or part of the blade, in a determined radial position relative to the rotation axis of the propeller.

During normal operating conditions of the propeller, the blade is held in its radial position by the fact that it is mounted on the propeller hub.

If a blade element or the hub itself should break, the retaining means prevents the entire blade or part of the blade from separating from the propeller and leaving said radial functional position to strike the aircraft fuselage or adjacent blades.

The fact that the retaining means is engaged inside the blade increases the stiffness of the blade and consequently improves its ability to resist the impact of a foreign body.

Furthermore, the blade portion that tends to break under the effect of an impact is the portion that does not include said retaining means. The blade portion comprising the retaining means thus remains held in radial position, which in particular makes it possible to control the mass of the separated blade portion and assure that it does not create any danger for the aircraft fuselage or adjacent blades.

Preferably, the propeller comprises a propeller hub support arranged inwards from said propeller hub, possibly fixed in rotation relative to said hub. Said retaining means may be mounted at an upper end of said blade and at an opposite lower end on said propeller hub or on said propeller hub support, so as to prevent any substantially radially outwards displacement of said retaining means.

In general, said retaining means may be mounted at its lower end on any fixed or rotating element of the propeller, and arranged substantially along the inwards radial direction from said blade root.

In the case in which the retaining means is mounted on the lower casing, said retaining means passing through said hub along the radial direction provides a means of retaining the propeller hub at the same time as retaining the blade.

According to the preferred embodiment, said blade is mounted free to pivot about said radial direction on said propeller hub, and the propeller comprises a mechanism for setting the incidence of the blade. Said retaining means is a preferably rigid rod, the lower end of which cooperates with said mechanism for setting the incidence of the blade.

Preferably, the retaining means comprises a stop part arranged radially inwards from said propeller hub or propeller hub support on which said lower end is mounted, said stop part being designed to come into contact with an abutment surface of said propeller hub or propeller hub support when the retaining means tends to be displaced along said radial outwards direction.

Advantageously, said blade comprises an airfoil prolonging said root. Said housing passes through the root along said radial direction and extends inside said airfoil along a substantially radially outwards direction, said retaining means being engaged over the entire length of said housing.

Advantageously, the upper end of said retaining means is mounted on said airfoil by an attachment means passing substantially transversely through said airfoil and said upper end of the retaining means.

Said attachment means may be a shaft or a pin.

Said retaining means preferably extend inside said blade along said radially outwards direction along a distance of between 0.2 and 0.6 times the length of said blade.

According to another embodiment of the invention, said retaining means consists of one or several cables.

The invention also relates to an aircraft turbomachine comprising at least one propeller according to any one of the previous characteristics.

Other advantages and characteristics of the invention will become clearer after reading the following non-limitative detailed description.

BRIEF DESCRIPTION OF THE DRAWINGS

We will now describe embodiments of the invention as non-limitative examples, with reference to the appended drawings among which.

DETAILED PRESENTATION OF A PREFERRED EMBODIMENT

Figure 2:
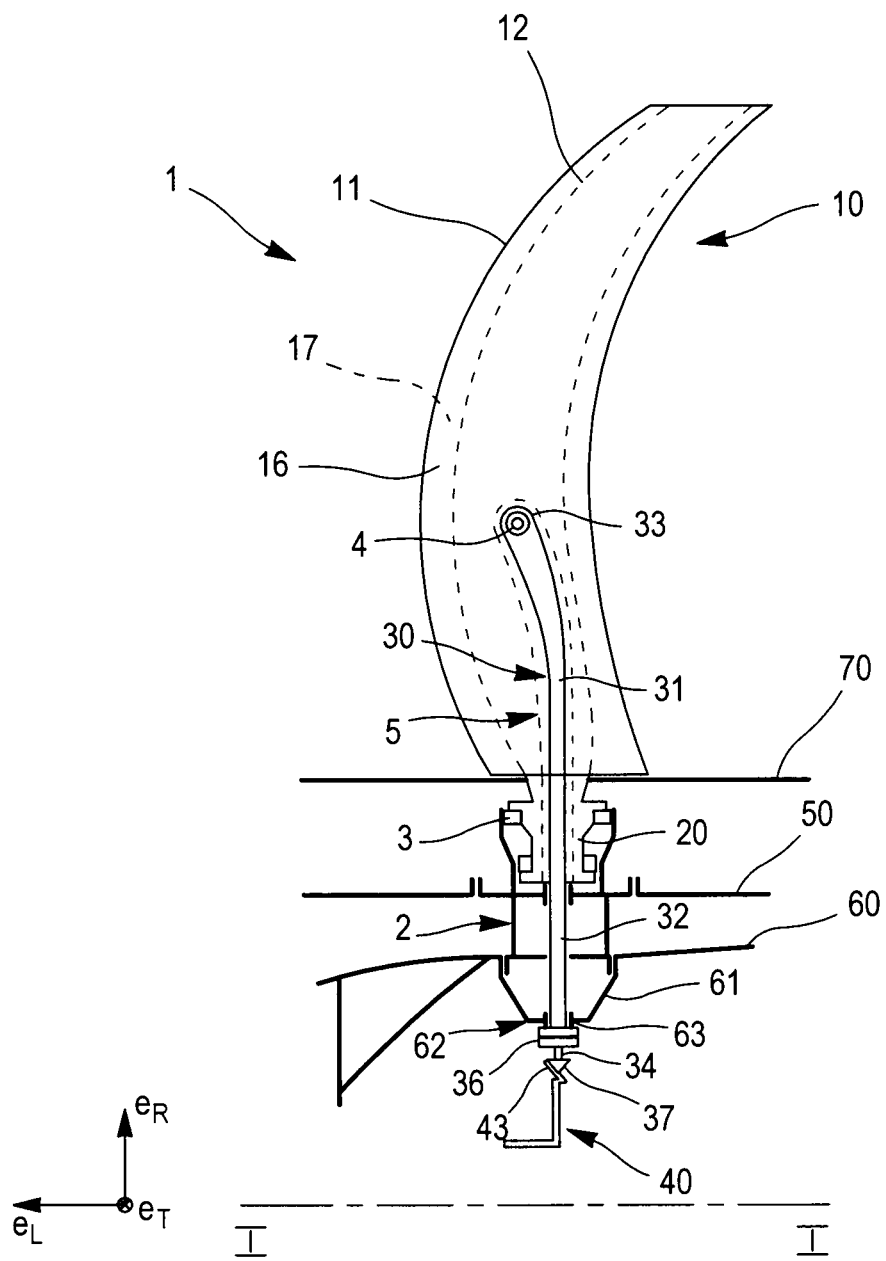
FIG. 2 shows a diagrammatic longitudinal sectional view along the rotation axis of the propeller showing a part of a propeller comprising a blade provided with a retaining means according to the preferred embodiment of the invention.

FIG. 2 illustrates a part of an aircraft turbomachine propeller according to the preferred embodiment of the invention.

Figure 1:
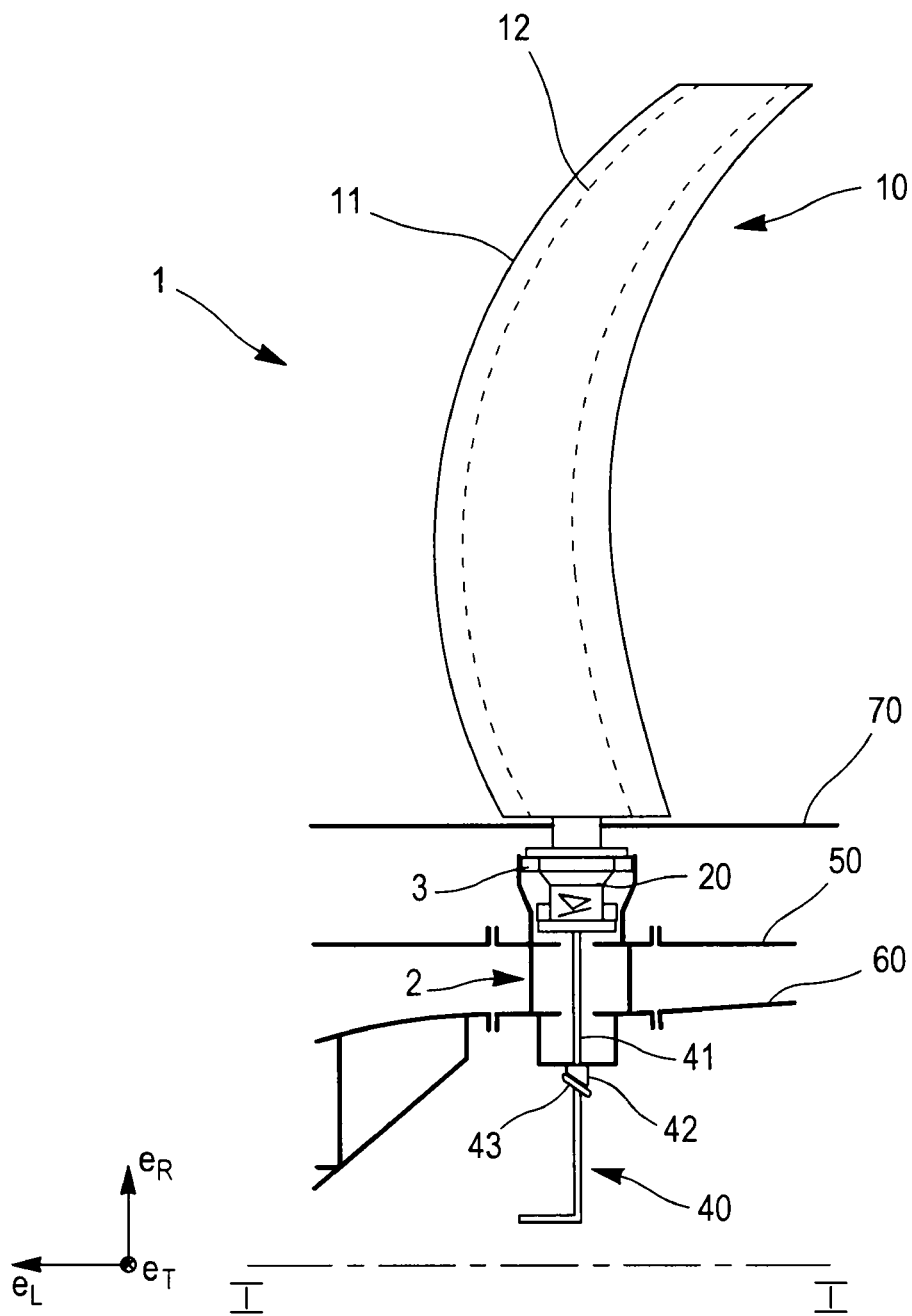
FIG. 1, already described, shows a diagrammatic longitudinal sectional view along the rotation axis of the propeller showing a part of a propeller comprising a blade according to prior art.

This part of the propeller comprises elements identical to or similar to those in the propeller part illustrated on FIG. 1 relative to prior art, denoted by numerical references identical to those in FIG. 1.

The propeller part illustrated in FIG. 2 presents a blade 1 comprising a housing 5 opening up at the root 20 of the blade 1 and that extends inside blade 1 over a portion of the blade, outwards along a direction substantially parallel to $e_R$.

According to the preferred embodiment of the invention, the housing 5 passes through the root 20 along the radial direction $e_R$ and extends into a portion of the airfoil prolonging said root. More precisely, the housing 5 extends inside the hollow structural core 12, along a portion of it. The housing inside said root is located along the axis of revolution of the general shape of the root 20.

The blade 1 is fitted with a blade retaining means 30 in the radially outwards direction. In this embodiment, the retaining means 30 is a rigid rod.

Said retaining means 30 is engaged inside said housing 5. More precisely, the retaining means 30 comprises an upper portion 31 housed inside said housing 5, and a lower portion 32 located outside said housing 5, that extends from the upper portion 31.

The retaining means 30 is fixed in translation in said radially outwards direction $e_R$.

The retaining means 30 comprises an upper end 33 at the upper portion 31, mounted on the airfoil 10 by an attachment pin 4, so as to prevent any relative displacement of the airfoil 10 relative to the retaining means 30.

Figure 4A:
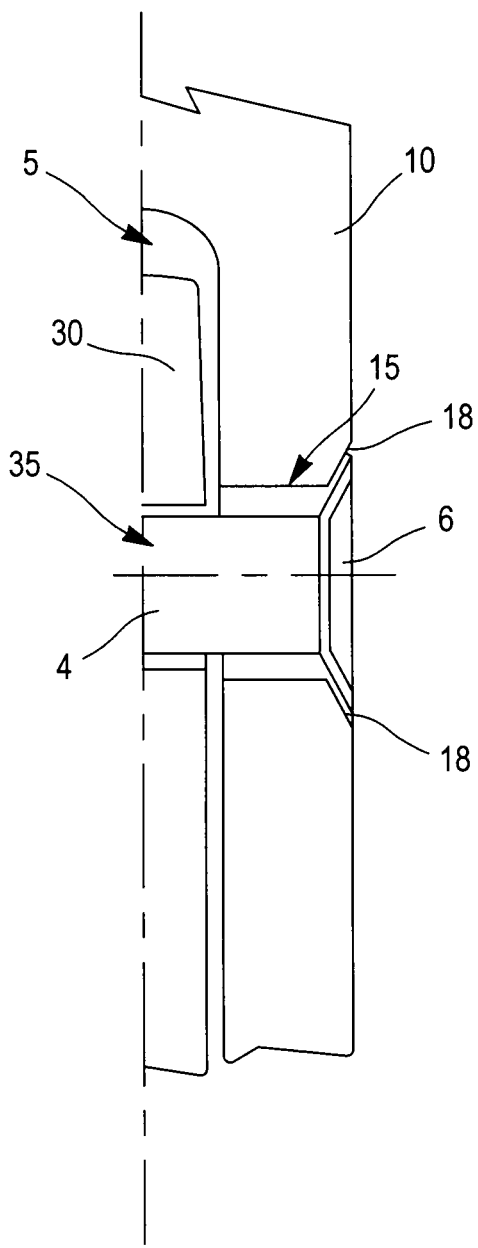
FIGS. 4A and 4B are detailed diagrammatic views showing a cross-section (FIG. 4A) and longitudinal section (FIG. 4B) of the first end of the retaining means of the propeller part shown in FIG. 2, mounted on the airfoil by an attachment pin, in the normal safety position.

The upper end 33 of the retaining means 30 comprises a through orifice 35 (see FIG. 4A). This orifice 35 of the retaining means 30 faces an orifice 15 passing through the airfoil 10 from the extrados 16 to the intrados 17.

These two orifices 15, 35 face each other, so that together they can house said attachment pin 4 used to mount the retaining means 30 on the airfoil 10.

The attachment pin 4 may be fixed or removable.

Any sort of pin, rivet or any other attachment device may be used instead of said attachment pin.

The retaining means 30 also has an opposite lower end 34 at its lower portion 32.

The hub 2 is also supported by a lower case 60 located radially inwards from said hub 2.

The lower end 34 of said retaining means 30 is mounted on said lower case 60, so as to prevent any outwards radial movement of said retaining means 30.

In the special case of this embodiment, the lower case 60 is fixed to the hub 2. Alternately, it may be free to rotate about the rotation axis of the propeller I-I and rotate at the same angular speed as the one of hub 2, or at a different speed.

Said lower end 34 of the retaining means 30 passes through the lower case 60 at a support part 61 of the lower case, in a U-shape facing inwards.

The support part 61 has an orifice 62 that extends circumferentially around said rotation axis of the propeller I-I.

The lower end 34 of the retaining means 30 comprises a substantially annular stop part 36 projecting from the adjacent surface of said lower end 34.

The surface of the edge of said orifice 62 forms a stop 63 located radially outwards from said stop part 36 of the retaining means 30.

Thus, when there is an impact of a bird or any other foreign body, the retaining means 30 follows a substantially radial outwards translation. The stop part 36 of the retaining means 30 is then in contact with the stop surface 63 of the lower case 60 and thus prevents any radial displacement of the retaining means 30, and therefore the blade 1, outwards.

Furthermore, the retaining means 30 is adapted to modify the incidence setting of the blade 1.

To achieve this, the lower end 34 of the retaining means 30 comprises a gear 37 or similar means engaging the toothed wheel 43 of a mechanism for setting the incidence 40 of the blade.

The gear 37 is located radially inwards from said stop part 36 of the retaining means 30.

Thus, when the toothed wheel 43 of the blade incidence setting mechanism 40 rotates the gear 37 of the retaining means 30, said retaining means 30 pivots about the radial direction $e_R$. Since the root 20 of the blade is mounted free to pivot on the hub 2 and the upper end 33 of the retaining means 30 is mounted on the airfoil 10, the pivoting of the retaining means 30 makes said blade 1 pivot.

Furthermore, the retaining means 30 extends inside the blade 1 over a distance equal to between 0.2 and 0.6 times the total length of the blade along the radial direction $e_R$. This distance is preferably equal to about 0.4 times said total length of the blade 1.

Thus, the portion of blade 1 holding the retaining means 30 is made rigid by the presence of the retaining means 30.

Following the impact of a foreign body, the portion of blade 1 that could still separate is the portion that does not hold the retaining means 30. Also, the mass of the separated portion is then known. The length of the retaining means 30 inside the blade 1 is defined such that the mass of the portion of separated blade does not create any danger for surrounding parts of the aircraft.

Furthermore, the general shape of the retaining means 30 is curved slightly forwards in its upper portion 31, and more precisely at its upper end 33, so that the pin 4 can be located in the thickest part of the airfoil.

The terms <<forward>> and <<aft>> refer to the direction of movement of the aircraft resulting from the thrust of the turbomachine, this direction being shown by the arrow $e_L$.

Figure 3:
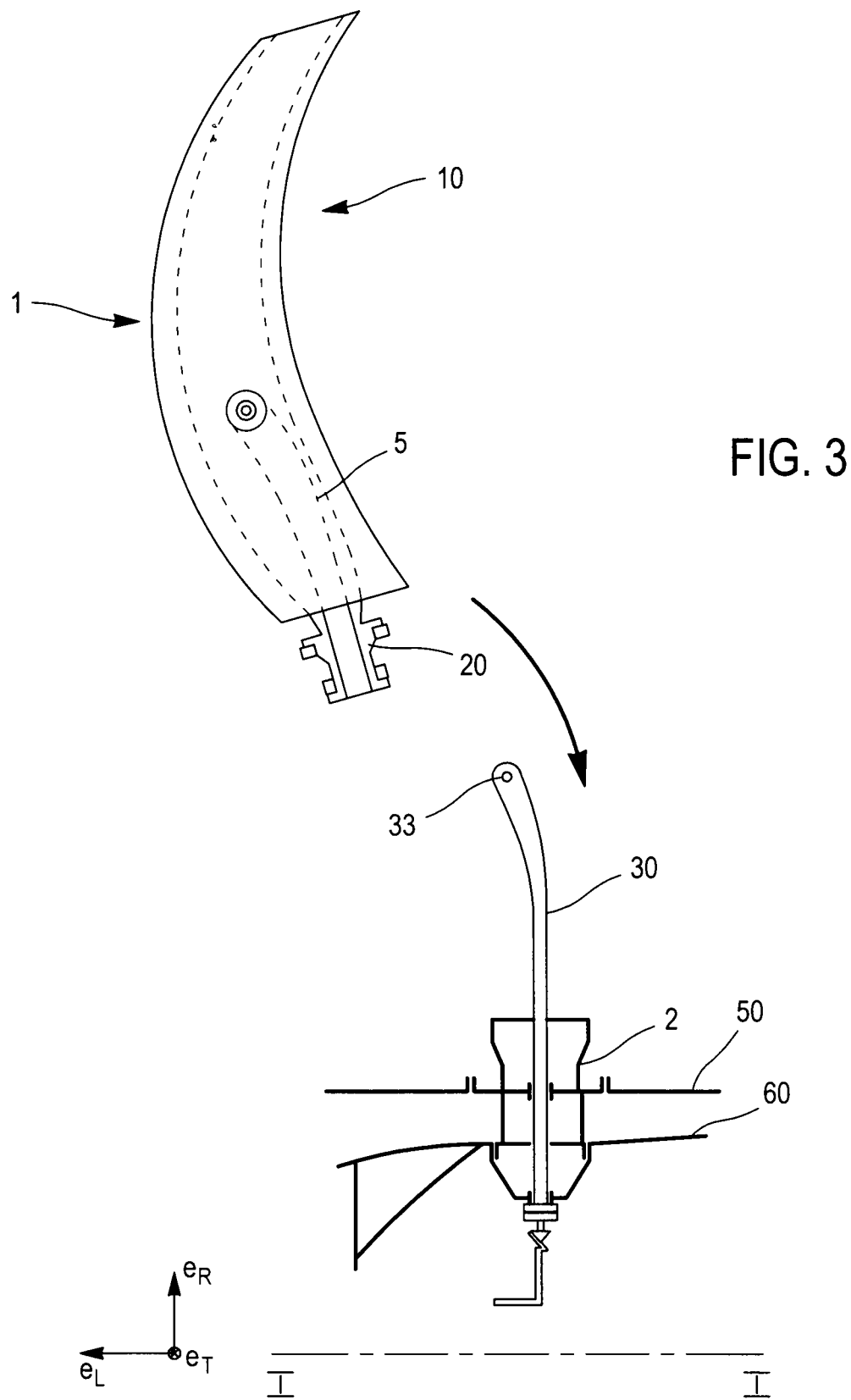
FIG. 3 shows a diagrammatic longitudinal sectional view of an assembly step of the propeller part illustrated on FIG. 2.

FIG. 3 illustrates an assembly step of said blade 1 on the hub 2 and the retaining means 30.

The assembly method of the blade 1 is particularly easy. In a first step, the retaining means 30 is mounted on the lower case 60 and passes radially outwards from the propeller hub 2.

The blade 1 of the hub 2 is then moved closer so as to insert the retaining means 30 into the housing 5 of the blade 1.

The root 20 of the blade is then mounted on the hub 2 through the ball bearing system 3, while the attachment pin 4 is inserted through the airfoil 10 and the upper end 33 of the retaining means 30.

Figure 4B:
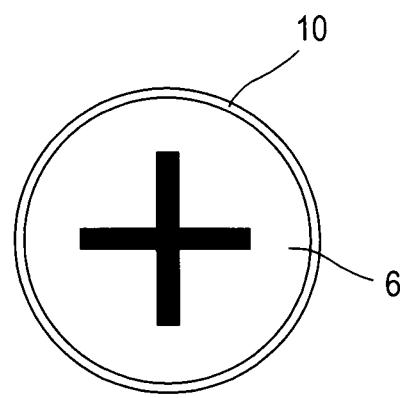

FIGS. 4A and 4B show a part of the airfoil 10 and the retaining means 30, at the attachment pin 4, in the normal attachment position. FIG. 4A is a cross-sectional view and FIG. 4B is the view of the attachment pin as seen for example by a maintenance agent.

The edge of the orifice 15 of the airfoil 10 comprises a part forming a seat 18 into which the head 6 of the attachment pin 4 fits.

The part forming a seat 18 is coated with a coating with a different colour from its environment, in particular the colour of the outer surface of the head 6 of the attachment pin.

The head 6 of the attachment pin and the part forming a seat 18 of the edge of the orifice 15 of the airfoil 10 each have a diameter such that in the normal operating position, the head 6 of the attachment pin covers substantially the entire part forming the seat 18. Thus, the colour of the part forming the seat 18 cannot be seen by a maintenance agent looking at the attachment pin in its position.

Figure 5A:
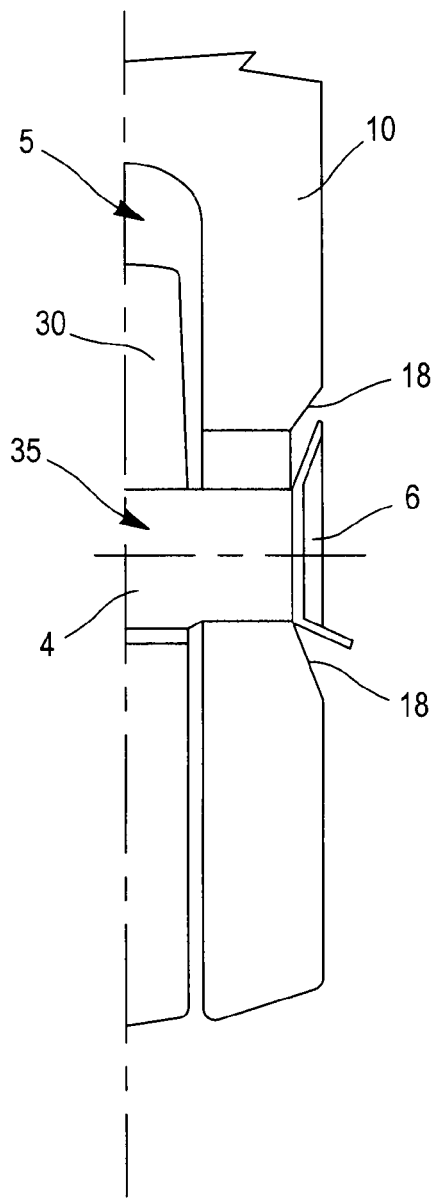
FIGS. 5A and 5B are detailed diagrammatic views showing a cross-section (FIG. 5A) and longitudinal section (FIG. 5B) of the first end of the retaining means of the propeller part shown in FIG. 2, mounted on the airfoil by an attachment pin, following the impact of a foreign body.
Figure 5B:
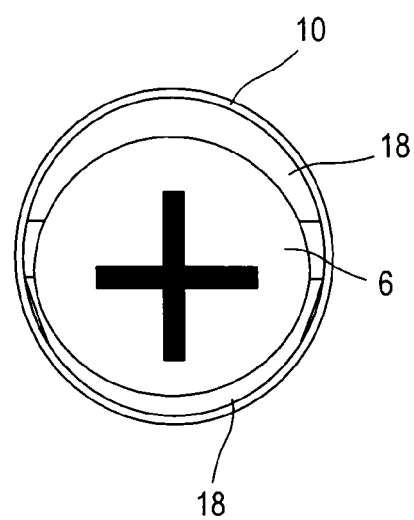

FIGS. 5A and 5B illustrate the same elements as those shown on FIGS. 4A and 4B, after an element of the airfoil or hub has broken.

The airfoil has been displaced substantially radially outwards, causing a small radial displacement. In this case, the retaining means 30 assured that the airfoil 10 did not separate from the lower case 60.

The small radial displacement of the airfoil 10 made the colour of the part forming the seat 18 of the orifice 15 of the blade 10 visible to a maintenance agent.

Thus, this safety criterion makes it easy and fast to assure that the airfoil is in good condition, or to decide that it needs to be repaired.

As a variant (not shown) of the preferred embodiment of the invention, the lower case 60 may be free to rotate about the rotation axis of the propeller I-I and rotate at an angular speed equal to the speed of the hub 2.

In this case, the orifice in the retaining part of the lower case 60 does not extend circumferentially around the axis of the propeller I-I, but has a circular shape coaxial with the retaining means 30.

According to another variant (not shown) of the preferred embodiment of the invention, the retaining means 30 is blocked in translation outwards on the propeller hub and not on the lower case.

The hub 2 then comprises an orifice through which the retaining means 30 passes, the edge of which comprises a surface forming a stop. This surface forming a stop is located close to or in contact with the stop part of the retaining means, in the radially outwards direction.

Furthermore, the lower end of the retaining means comprises a gear like that described above, to cooperate with a mechanism for setting the incidence of the blade.

Finally, according to another variant, the housing provided inside the blade 1 can extend only inside the root 20 without being prolonged inside the airfoil 10. The upper end of the retaining means 30 is then installed fixedly on said root, inside it. An attachment pin passing transversely through the root and the retaining means, similar to that described previously, blocks the blade in radially outwards translation relative to the retaining means.

Figure 6:
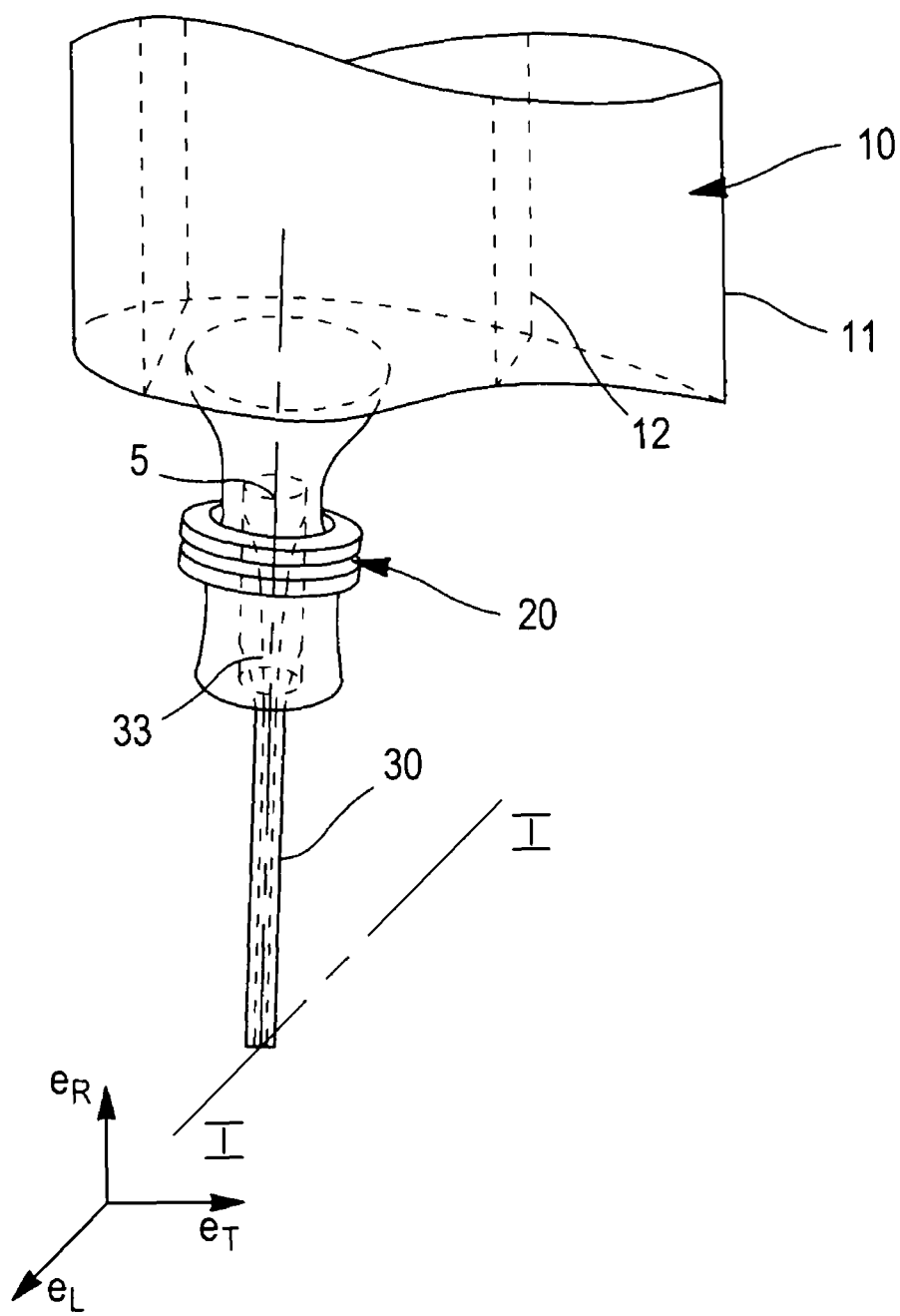
FIG. 6 is a perspective view of a propeller part according to a second embodiment of the invention.

FIG. 6 shows a perspective view of a part of blade provided with a retaining means 30, according to a second embodiment of the invention.

The retaining means 30 is a plurality of cables, preferably flexible, fixed at their upper end 33 to the blade and at their lower end 34 to the lower case or to the propeller hub.

These cables are engaged in a housing 5 shown on FIG. 6 that extends inwards inside the root 20 of the blade and that opens up at the lower surface of the root.

Alternately, the housing 5 can pass through the root 20 along the radial direction and extend inside the blade 1, as described for the preferred embodiment. The upper ends 33 of the cables are then fixed to the airfoil 10.

The blade can pivot about the radial direction under the action of a mechanism for setting the incidence of the blade.

This mechanism then comprises a rod like that described with the reference to prior art and shown in FIG. 1.

The cables 30 can then be arranged around said rod so as to extend along it.

Alternately, the setting mechanism rod may be hollow and contain retaining cables.

Obviously, a person skilled in the art can make various modifications to the invention that has just been described simply as non-limitative examples.

Furthermore, the invention is also applicable to turboprops, turbo-engines, preferably of the <<open rotor>> type.

The invention claimed is:

1. An aircraft turbomachine propeller, comprising:
    a plurality of arcuate blades each comprising a root mounted on a hub rotating about the rotation axis of the propeller and an airfoil that prolongs the root, at least one blade comprising a means of retaining the blade in an outwards radial direction, said retaining means being engaged in a housing of said blade opening radially inwards at the root of the blade, and fixed in translation in said outwards radial direction,
    said housing passing through the root along said radial direction and extends inside said airfoil along an approximately radially outwards direction, said retaining means being engaged over the entire length of said housing,
    wherein said retaining means is mounted, at its upper end, on said airfoil by an attachment means passing substantially transversely through said airfoil and said upper end of the retaining means,
    wherein at least a portion of the retaining means and a corresponding portion of the housing engaged with the retaining means inside the airfoil includes an arcuate portion,
    wherein the arcuate portion of the retaining means and the arcuate portion of the housing curve in a same first direction, and
    wherein the plurality of arcuate blades curve in a second direction opposite the first direction.

2. The propeller according to claim 1, wherein said propeller includes a propeller hub support arranged inwards from said propeller hub, said retaining means being mounted at an upper end on said blade and at an opposite lower end on said propeller hub or on said propeller hub support, so as to prevent any substantially radially outwards displacement of said retaining means.

3. The propeller according to claim 1, wherein said blade is mounted free to pivot about said radial direction on said propeller hub, said propeller comprising a mechanism for setting the incidence of the blade,
    and in that said retaining means is a rod of which the lower end cooperates with said mechanism for setting the incidence of the blade.

4. The propeller according to claim 1, wherein said retaining means includes a stop part arranged radially inwards from said propeller hub or propeller hub support on which said lower end is mounted, said stop part being designed to come into contact with an abutment surface of said propeller hub or propeller hub support when the retaining means tends to be displaced along said radial outwards direction.

5. The propeller according to claim 1, wherein said attachment means is a shaft or a pin.

6. The propeller according to claim 1, wherein said retaining means extends inside said blade along said radially outwards direction along a distance of between 0.2 and 0.6 times the length of said blade.

7. An aircraft turbomachine comprising:
    at least one propeller according to any one of the previous claims.

8. The propeller according to claim 1, wherein the attachment means is located in a thickest part of the airfoil.

* * * * *